United States Patent
Serrat Bote, Sr. et al.

(10) Patent No.: US 11,538,091 B2
(45) Date of Patent: Dec. 27, 2022

(54) METHOD OF DIGITAL PRODUCT ONBOARDING AND DISTRIBUTION USING THE CLOUD SERVICE BROKERAGE INFRASTRUCTURE

(71) Applicant: Ingram Micro, Inc., Irvine, CA (US)

(72) Inventors: Marc Serrat Bote, Sr., Barcelona (ES); Maxim Kuzkin, Irvine, CA (US); Vladimir Grebenschikov, Moscow (RU); David Wippich, Irvine, CA (US)

(73) Assignee: CloudBlue LLC, Irvine, CA (US)

( * ) Notice: Subject to any disclaimer, the term of this patent is extended or adjusted under 35 U.S.C. 154(b) by 79 days.

(21) Appl. No.: 16/235,855

(22) Filed: Dec. 28, 2018

(65) Prior Publication Data
US 2020/0211089 A1    Jul. 2, 2020

(51) Int. Cl.
*G06Q 30/00* (2012.01)
*G06Q 30/06* (2012.01)
*G06F 9/54* (2006.01)

(52) U.S. Cl.
CPC ......... *G06Q 30/0635* (2013.01); *G06F 9/547* (2013.01); *G06Q 30/0603* (2013.01)

(58) Field of Classification Search
CPC ... G06Q 30/0601–0645; G06Q 10/087; G06Q 20/102; H04L 67/10; H04L 29/08468; G06F 9/547
USPC ................................................. 705/26.1–27.2
See application file for complete search history.

(56) References Cited

U.S. PATENT DOCUMENTS

| | | | |
|---|---|---|---|
| 7,996,488 B1 * | 8/2011 | Casabella | G06F 15/16 709/217 |
| 10,395,293 B1 * | 8/2019 | Mangtani | G06Q 30/062 |
| 2005/0027611 A1 * | 2/2005 | Wharton | G06F 17/60 705/26 |
| 2011/0314082 A1 | 12/2011 | Koneti | |
| 2012/0185913 A1 * | 7/2012 | Martinez | G06Q 30/0635 |

(Continued)

OTHER PUBLICATIONS

Kim, Huioon, et al. "Experience in Practical Implementation of Abstraction Interface for Integrated Cloud Resource Management on Multi-Clouds." KSII Transactions on Internet and Information Systems 11.1 (2017): 18(21). ProQuest. Web. Oct. 28, 2021. (Year: 2017).*

(Continued)

*Primary Examiner* — Jeffrey A. Smith
*Assistant Examiner* — Kennedy Gibson-Wynn
(74) *Attorney, Agent, or Firm* — Ice Miller LLP

(57) ABSTRACT

The present disclosure relates to a system and method of digital product onboarding and distribution using a cloud service brokerage (CSB) infrastructure, whereby the method includes creating a product model at a vendor portal computing device, the product model based at least in part on a first product, storing the product model at a marketplace product catalog, exporting the product model to a third-party CSB platform, exporting the product model to an ordering system, configuring an application programming interface (API) to receive a request for integration of the first product, receiving, at the order system, the request for the first product, wherein the request includes a request product model payload, and fulfilling, at the order system, the request for the first product, based at least in part on a product attribute.

9 Claims, 4 Drawing Sheets

(56) References Cited

U.S. PATENT DOCUMENTS

| | | | |
|---|---|---|---|
| 2013/0013462 A1* | 1/2013 | Deng | G06F 9/5011 |
| | | | 705/27.1 |
| 2013/0198386 A1* | 8/2013 | Srikanth | H04W 4/21 |
| | | | 709/203 |
| 2013/0262626 A1* | 10/2013 | Bozek | H04L 67/10 |
| | | | 709/217 |
| 2015/0161681 A1 | 6/2015 | Maes | |
| 2016/0065417 A1 | 3/2016 | Sapuram | |
| 2016/0125489 A1 | 5/2016 | Gupte | |
| 2017/0069011 A1* | 3/2017 | Akkiraju | G06Q 30/0625 |
| 2018/0316772 A1 | 11/2018 | Eberlein | |

OTHER PUBLICATIONS

Soares, João Monteiro. "Integration of the Cloud Computing Paradigm with the Operator Network's Infrastructure." Order No. 27933773 Universidade de Aveiro (Portugal), 2016. Ann Arbor: ProQuest. Web. Apr. 27, 2022. (Year: 2016).*

Laga, Nassim, et al. "A Flexible Service Selection for Executing Virtual Services." World Wide Web 16.3 (2013): 219-45. ProQuest. Web. Aug. 11, 2022. (Year: 2013).*

Gu, Fei, Jianwei Niu, and Zhenxue He. "A Research on Mobile Cloud Computing and Future Trends." EAI Endorsed Transactions on Industrial Networks and Intelligent Systems 3.7 (2016): n/a. ProQuest. Web. Aug. 11, 2022. (Year: 2016).*

\* cited by examiner

FIG. 2

METHOD OF DIGITAL PRODUCT ONBOARDING AND DISTRIBUTION USING THE CLOUD SERVICE BROKERAGE INFRASTRUCTURE

TECHNICAL FIELD

The present disclosure relates to a system and method of software delivery in a cloud service broker (CSB) platform, and specifically, for a system and method for Of Digital Product Onboarding And Distribution Using The Cloud Service Brokerage Infrastructure.

BACKGROUND

When a reseller begins selling cloud services where the service owner is an external independent software vendor (ISV), resellers may have to run a cloud service broker (CSB) platform to facilitate selling the cloud services. The CSB would be configured to provide a unique user interface (UI) that integrated offers from different ISVs, an operating system for performing different control actions on the services (provisioning, deleting, changing etc.), a billing system for performing calculations of consumption/licensing fees, and generating invoices for their sub-resellers and customers. CSB platform may also be integrated with a plurality of different service vendors (e.g. Microsoft®, Dropbox®, Kaspersky Lab®) interfaces or special connectors.

In some cases, resellers may already offer other services unrelated to cloud services. By way of an example, a reseller in the hardware distribution business may have already implanted a solution for billing their sub-resellers and customers, they have tuned working CRM and many other custom system or IT business systems from any popular vendors of such systems (Oracle, QuickBooks, SalesForce, SAP etc.). As a result, launching a new platform with built-in IT solutions that enable selling products (it may be cloud services but also anything that is being handled by ISV) become too costly and ineffective.

On the other hand, service vendors may also suffer from complicated integration processes with the CSB platform. The complications may cause changes of application programming interfaces (APIs), require developing new APIs, adjusting billing rules, and the like. As a result, integration costs may exceed the revenue of selling through the Platform channel for many periods and even make the process of integration impossible if the vendor already has contracts with other similar CSB platforms.

Therefore, there is a need for a new and improved system and method of digital product onboarding and distribution using the cloud service brokerage infrastructure, and specifically, integration with vendor's systems and with the third-party it business systems used by a reseller, whereby a vendor can integrate with one CSB system, and display new service offerings on such vendor's e-commerce and IT business systems.

SUMMARY

In at least one embodiment of the present disclosure, there is shown a schematic drawing of a system for digital product onboarding and distribution using the cloud service brokerage infrastructure. The system includes and ISV device, an ordering system, a vendor portal computing device, a marketplace computing device, and third-party computing device.

In at least one embodiment of the present disclosure, a developer (for an ISV that wants to integrate its service with the CSB platform) may use a vendor UI portal in the vendor portal computing device. In at least one embodiment of the present disclosure, the developer of the ISV may use the vendor portal computing device to fill in the general attributes of a product for sale, where such attributes may include, for example, product name, logo, product ID that will be further used in API calls, name of the account that owns this product from the ISV side, product fulfillment mode that define whether how provisioning/change/deletion will happen, short product overview for CSBs and the detailed overview of the product for CSBs.

In at least one embodiment of the present disclosure, the vendor portal computing device and the product catalog are configured to generate the product model for a particular product. In at least one embodiment of the present disclosure, the product definition may operate by way of API calls.

In at least one embodiment of the present disclosure, there is shown a standard fulfillment API workflow. In at least one embodiment of the present disclosure, API calls are relative to requests for a purchase order; and the purchase order is relative to a single asset with multiple product items from the ISV. In at least one embodiment of the present disclosure, the system is configured to allow an asset defined as a recurring or one-time service or a product and a workflow of requesting these assets. In at least one embodiment of the present disclosure, all such requests get into a queue and then are processed either by an operator using the fulfillment UI or automatically via the integration through the fulfillment API.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein:

FIG. 2 displays an exemplary catalog of a system and method for digital product onboarding and distribution using the cloud service brokerage infrastructure, according to at least one embodiment of the present disclosure.

DETAILED DESCRIPTION

Figure 1:
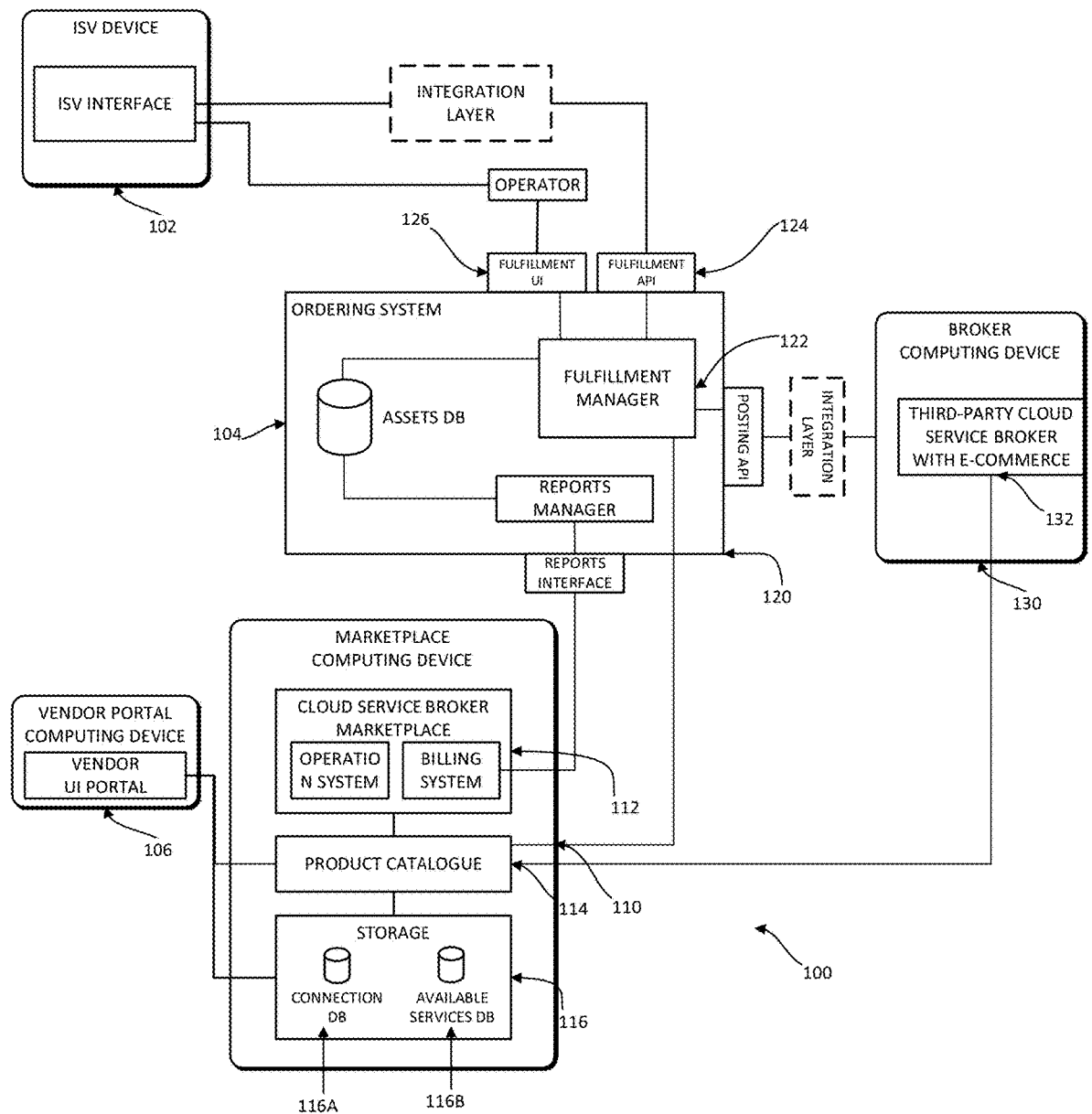
FIG. 1 displays a schematic drawing of a system for digital product onboarding and distribution using the cloud service brokerage infrastructure, according to at least one embodiment of the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

This detailed description is presented in terms of programs, data structures or procedures executed on a computer or network of computers. The software programs implemented by the system may be written in any programming language-interpreted, compiled, or otherwise. These languages may include, but are not limited to, Xcode, iOS, cocoa, cocoa touch, MacRuby, PHP, ASP.net, HTML, HTML5, Ruby, Perl, Java, Python, C++, C #, JavaScript, and/or the Go programming language. It should be appreciated, of course, that one of skill in the art will appreciate that other languages may be used instead, or in combination with the foregoing and that web and/or mobile application frameworks may also be used, such as, for example, Ruby on Rails, System.js, Zend, Symfony, Revel, Django, Struts, Spring, Play, Jo, Twitter Bootstrap and others. It should further be appreciated that the systems and methods disclosed herein may be embodied in software-as-a-service available over a computer network, such as, for example, the Internet. Further, the present disclosure may enable web services, application programming interfaces and/or service-oriented architecture through one or more application programming interfaces or otherwise.

Referring now to FIG. 1, there is shown a schematic drawing of a system for digital product onboarding and distribution using the cloud service brokerage infrastructure, generally indicated at 100. The system 100 includes and ISV device 102, an ordering system 104, a vendor portal computing device 106, a marketplace computing device 110, and third-party computing device 130.

In at least one embodiment of the present disclosure, a developer (for an ISV that wants to integrate its service with the CSB platform) may use a vendor UI portal in the vendor portal computing device 106. It will be appreciated that in order for the ISV to integrate with the CSB platform, the ISV may need to create a product model via the vendor portal computing device 106, as further disclosed herein. It will be further appreciated that the approach of creating product models is product-agnostic as there is no application packaging standard (APS) specific requirement in the format of the product model. In at least one embodiment of the present disclosure, the developer of the ISV may use the vendor portal computing device 106 to fill in the general attributes of a product for sale, where such attributes may include, for example, product name, logo, product ID that will be further used in API calls, name of the account that owns this product from the ISV side, product fulfillment mode that define whether how provisioning/change/deletion will happen, short product overview for CSBs and the detailed overview of the product for CSBs.

In at least one embodiment of the present disclosure, the developer of the ISV may also set a product definition and related business model in the product catalog 114. In at least one embodiment of the present disclosure, the product catalog 114 may include a user interface. It will be appreciated that the product catalog 114 is configured to accommodate a plurality of possible product definitions and business models so that various products can be orchestrated within the product catalog 114, thereby making the marketplace computing device 110, product agnostic.

It will further be appreciated that an ISV may have a very complex structure for its product models. By way of an example, ISVs may have very complex rules for how a product may be sold. For example, products may have dependencies—a first product item can only be if a second product item was previously used by the user; or a first reseller can only sell one group of product items but cannot sell another group of product items. By way of another example, a first quantity of a first product item may depend on a first quantity number of second product item via a specific functional dependency.

It will be appreciated that ISVs keep this business logic internally in unstructured data stores. However, integration with a CSB marketplace 112 would require that such products are properly cataloged in order to be sold unified and automated where possible. Therefore, ISVs may encounter challenges to integrate and automate their product model(s) and business rule(s), especially if the ISV needs to make it fast and efficient.

In at least on embodiment of the present disclosure, the ISV defines the product model which will be stored and processed in the product catalog 114. For clarity, and without limiting the definition hereto, a product is configured as something that can be sold (standalone, or otherwise). In at least one embodiment of the present disclosure, a product is the minimum sellable (and conversely, purchasable) commodity/item. In at least one embodiment of the present disclosure, a product item is part of a product which is reflected and accounted as its own line item in financial documents. In at least one embodiment of the present disclosure, at least one product item must be purchased when the product is purchased, whereas all others may be optional. It will be appreciated that product items may have a price. In at least one embodiment of the present disclosure, a product offer is a particular business offer related to the product. By way of an example, when a customer (or reseller) purchases a product—a particular offer may be selected with fixed product pricing, currency, discounts, and other details, to name a few, non-limiting examples.

It will be appreciated that by defining the product model of the product that an ISV is going to sell, product attributes are also defined, including, but not limited to: product item IDs, a measure of units of the product items; internal ID from the vendor system; and the like. It will be further appreciated that every product item is assigned to a stock keeping unit (SKU), which is an identifier of the product item in the CSB platform.

In at least one embodiment of the present disclosure, a product item may have a hierarchical complex structure. The structure might be defined by at least one of a plurality of rules as further disclosed herein. In at least one embodiment of the present disclosure, each product item is unique at each level. By way of an exemplary embodiment, such a product may only be ordered at the assigned level of the hierarchy. By way of a non-limiting example, in mobile service procurement, a buyer may buy as many telephone numbers as desired and also can buy a data/minutes package that will be shared by all associated telephone numbers. Similarly, in another product, it may be that a telephone number is first purchased and then a data/minutes package is subsequently purchased.

Continuing with the above exemplary embodiment, the structure may be such that it can only be ordered once (with quantity assigned); or, following the initial order, only quantity changes could be requested.

In at least one embodiment of the present disclosure, each product item may also define if there are any child product items and whether they are unique or are configured as a collection. By way of another exemplary embodiment, a child product items defines incompatibility rules with other product items at the same level; a child product item defines compatibility rules with the parent product item(s); and each product item at any level may define compatibility to transition to another product item at the same level.

In at least one embodiment of the present disclosure, there is support for product item cancellation and renewal is optional (one-time fee items and alike).

In at least one embodiment of the present disclosure, each of the contract dates (anniversary, duration, billing, rules, etc.) can be set on a certain level of the hierarchy and are inherited by items in lower levels. By way of an example, if the contract date is set at level 0, all underlying levels will follow; similarly, if the contract date is set at level 1, different dates for product items at level 1 may differ, but lower levels follow parents.

In at least one embodiment of the present disclosure, product items of each level might have additional attributes assigned to them (which are also visible by their children), whereby these attributes can be defined by the product owner, and then passed to provisioning level.

Figure 2:
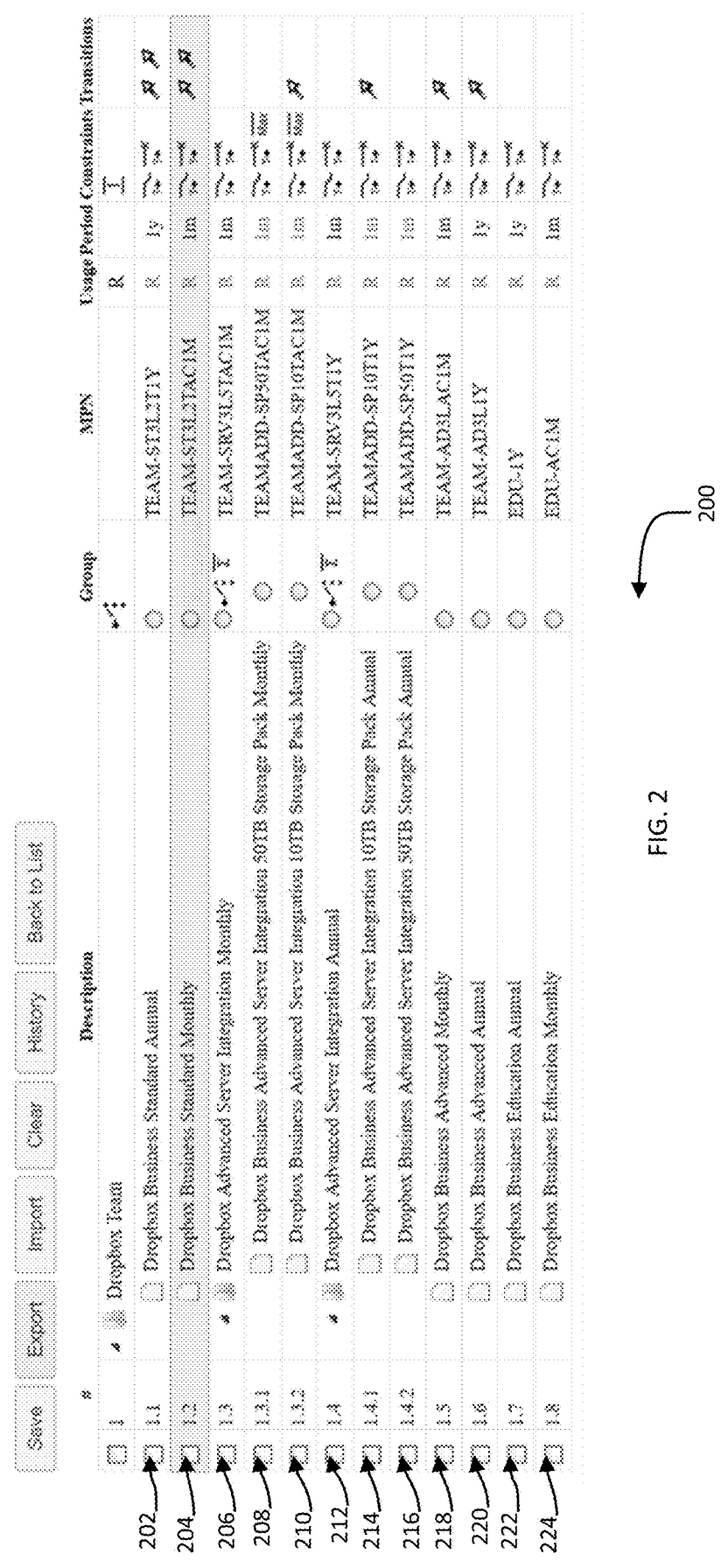

Referring now to FIG. 2, there is shown an exemplary embodiment of a product model construction tool interface, generally indicated at 200. The interface 200 includes eight (8) product items at level-1 (i.e. 202, 204, 206, 212, 218, 220-224); and where two level-1 product items (i.e. 206 and 212) have their own child product items: 206 has child product items 208 and 210; and 212 has child product items 214 and 216.

It will be appreciated that with this product model construction tool, which may be part of the product catalog 114, the ISV is able to build any product structure in accordance with the ISV's business model. It will also be appreciated that the product model construction tool may be provided via an API. In at least one embodiment of the present disclosure, the product model construction tool generates a computer readable file, for example, in JavaScript Object Notation (JSON), based on this representation of the product model. It will be appreciated that the computer readable file (i.e. in JSON format) may be used for processing API calls, and allowing validation of incoming requests that contains order information against the product definition stored in the product catalog 114.

In at least one embodiment of the present disclosure, the vendor portal computing device 106 and the product catalog 114 are configured to generate the product model (as exemplarily shown via interface 200) for a particular product. It will be appreciated that the product model may also be transmitted to a third-party CSB 130 e-commerce platform which third—party CSB e-commerce platform may use the data from the product model for displaying the offer of this product in the e-commerce system. It will be further appreciated that the ordering system 100 also stores the product model, whereby the product catalog 114 operably communicates with a fulfillment manager 122 and allowing the system 100 to process the requests from any third-party CSB 130 that refers to this particular product according to the product definition set by the ISV. In at least one embodiment of the present disclosure, the product definition may operate by way of API calls.

In at least one embodiment of the present disclosure, a third-party CSB 130 may want to create a contract with CSB marketplace 112. In at least one embodiment of the present disclosure, the CSB marketplace 112 is configured to add the new connection in a connection database 116A, and create a set of credentials for accessing the ordering system for the third-party CSB 130. The system 100 is configured to receive posting API calls from the third-party CSB 130. In at least one embodiment of the present disclosure, the third-party CSB 130 may optionally display the data from the product model for displaying the product offer. In some embodiments, the third-party CSB 130 may incorporate the product model for further integrating it with internal e-commerce system(s) for automatic tracking of actions with the product in internal systems (e.g. QuickBooks, SalesForce, Oracle and so on).

Figure 3:
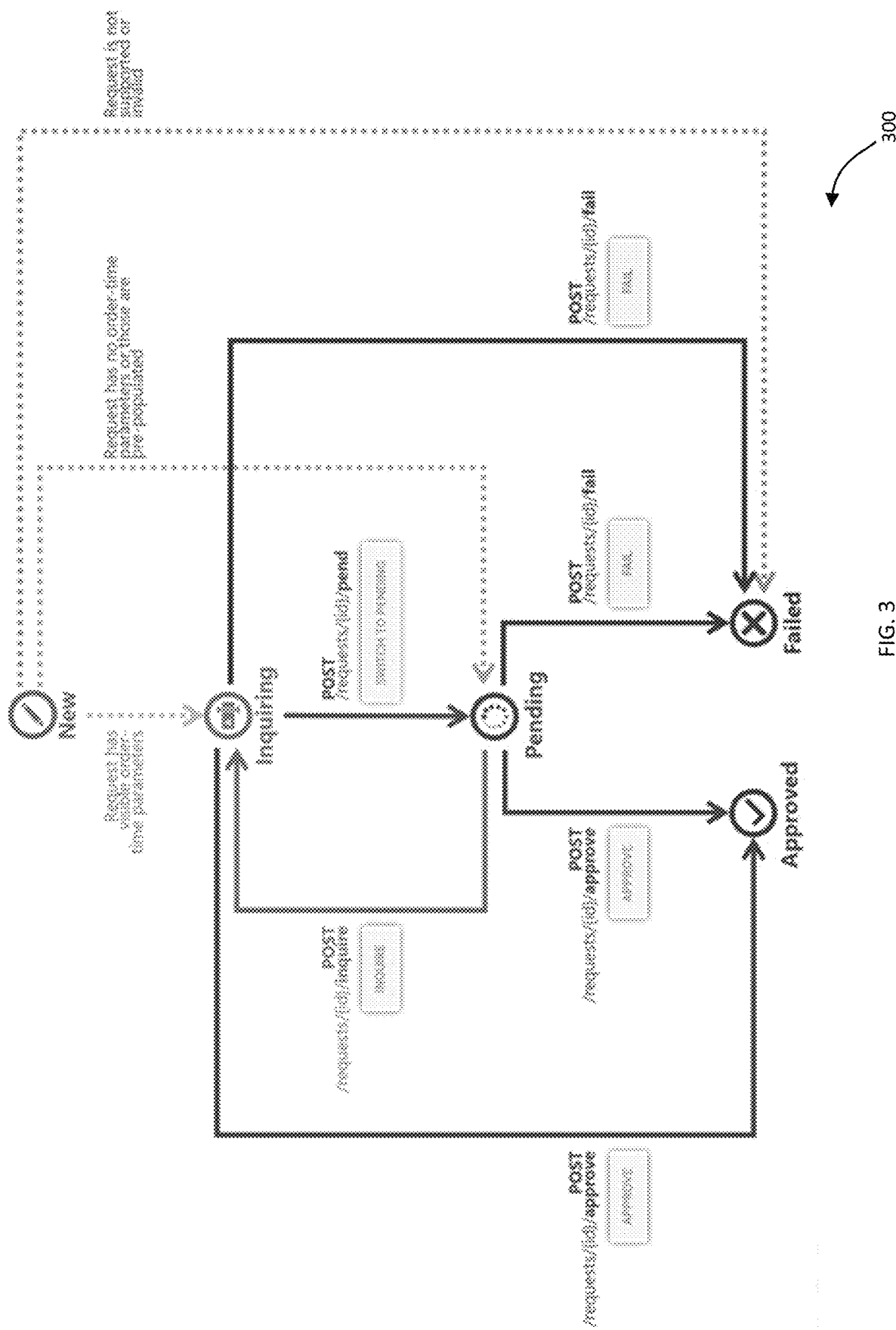
FIG. 3 displays a workflow of a method for digital product onboarding and distribution using the cloud service brokerage infrastructure, according to at least one embodiment of the present disclosure.

In at least one embodiment of the present disclosure, the integration layer is optional and is aimed to translate third-party CSB 130 APIs into the standard posting API of the ordering system 100. Referring now to FIG. 3, there is shown a standard fulfillment API workflow, generally indicated at 300.

In at least one embodiment of the present disclosure, API calls are relative to requests for a purchase order; and the purchase order is relative to a single asset with multiple product items from the ISV. The system 100 is configured to allow an asset defined as a recurring or one-time service or a product and a workflow of requesting these assets. In at least one embodiment of the present disclosure, all such requests get into a queue and then are processed either by an operator using the fulfillment UI 126 or automatically via the integration through the fulfillment API 124.

In at least one embodiment of the present disclosure, an asset is characterized by the following: (i) Every asset reflects some purchase (somebody purchases either a service or a good); (ii) Purchase requests can be reverted (canceled) or terminated when terms of purchase are expired; (iii) An asset can be subscription-based (when customer pays for usage in some time terms) or one-time based; (iv) Matter of asset is defined as a list of purchased SKUs with purchased quantities (asset items); (v) Item in the asset may be either reservation-based when a customer decides how much items of SKU to be purchased or 'pay-per-user' basis when actual use of the SKU defines the quantity for asset item; (vi) the asset may be modified using change requests: either set of items may be changed or quantities of reservation-based items may be changed; (vii) Some assets can be put into suspend state when service is not actually provided and no charges happened; and (viii) Assets also may be parametrized by one or more parameters which differentiate one asset from another.

In at least one embodiment of the present disclosure, the fulfillment manager 122 keeps track of assets, check the validity of requests, by the information from the request check it against the product model set in the product catalog 114.

It will be appreciated that each ISV, independently of the third-party CSB 130 platform logic, is able to interact with the ordering system using a product agnostic API (i.e. fulfillment API 124). This fulfillment API 124 delivers basic endpoint to operate with the different requests generated by the third-party CSB 130 platform in a consistent manner independently of operation (e.g. purchase, change, delete) or product owned by ISV.

In at least one embodiment of the present disclosure, the available operations for the API are: (i) Get Requests List—GET/requests; (ii) Get Request Details—GET/requests/{id}; (iii) Modify Request Data—PUT/requests/{id} and PATCH/requests/{id}; and (iv) Change Request Status—POST/requests/{id}/{status}.

In at least one embodiment of the present disclosure, where the GET request methods provide the collection of requests objects available to the vendor, additional filtering is possible to limit the request returned by fulfillment system. Available filters include: (i) request status is pending, inquiring, approved or failed; (ii) created after a certain date; (iii) for a concrete asset, obtaining with that all orders relative to a concrete asset; and (iv) For a concrete product, in case that ISV provides multiple products at the same time.

In at least one embodiment of the present disclosure, each of the returned objects represents a unique request, each of them provides: (i) Unique identifier of the request (ID); (ii) Type of the request, possible values are: (a) purchase: initial request for a new asset; (b) change: a modification on existing asset relative to the items purchased, one asset may have multiple change requests on its life cycle; (c) cancel: relative to the request to terminate a concrete asset suspension: to put temporally on the suspended asset on ISV platform; (d) resume: request to return to normal state a previously suspended asset; (iii) status: any of the possible status based on the workflow/lifecycle of a request; (iv) asset structure contains information about: (a) unique identifier of the asset from the ordering system; (b) unique product information to identify for what concrete product request is; (c) connection information to identify the exact contract between ISV and CSB marketplace 112 to which the asset is bound to; (d) concrete information relative to the different companies involved in the request, being customer information or any of the intermediate resellers (and it will be appreciated that the CSB marketplace 112 information is delivered by product sectors or by geography); (e) concrete parameters information relative to either the asset on ISV system or relative to ordering parameters in order to be able to complete the request; or (f) items purchased based on ISV MPN identifiers (or by SKU if we are talking in CSB marketplace terms), information provided includes quantities, either for a new purchase or even old quantities in case of change order.

An exemplary embodiment of the payload is provided here:

```
{
    "id": "PR-9861-7949-8492", //Unique identifier of the request in the ordering system
    "type": "purchase", //Type of request, can be purchase, change, suspend, resume or delete
    "created": "2018-06-04T13:19:10.102670+00:00", //when request was created
    "updated": "2018-06-04T13:19:10.102670+00:00", // last update of request
    "status": "pending", // Either pending, inquiring, approved, failed
    "asset": {
        "id": "AS-9861-7949-8492", //Unique identifier of the asset
        "external_id": "", //External ID of the asset in the third-party e-commerce platform
        "product": {
            "id": "CN-9861-7949-8492", //Unique identifier of the product sold
            "name": "Fallball Awesone"
        },
        "connection": {
            "id": "CT-9861-7949-8492", //Unique identifier of the connection of a given third-party CSB 130, stored in the connection DB
            "type": "production", //Either test, either production connection
            "provider": {
                "name": "Ingram Micro Prod DA",
                "id": "PA-9861-7949-849" //Unique ID of the third-party CSB 130 in the ordering system
            },
            "vendor": {
                "name": "Large Largo and Co",
                "id": "VA-9861-7949-849" //Unique ID of the vendor in the ordering system
            }
        },
        "items": [{ //List of all items that can be acquired on a given product, ones purchased have quantity / old_quantity
            "id": "SKU-9861-7949-8492-0001", //Unique ID of the SKU sold
            "mpn": "TEAM-ST3L2TAC1M",
            "quantity": "3", //Purchased quantity
            "old_quantity": "" //Old quantity, value filled in case of change request
        }
        ],
        "params": [{ //List of parameters defined by vendor that either are filled by customer, either by vendor
            "id": "PM-9861-7949-8492-0001 #AUTOGEN #PRODUCT",
            "name": "Secondary email",
            "description": "This is a backup email for emergency",
            "value": "daniel.lark@gmail.com",
            "value_error": "This address is already used. Try another.",
            "value_choices": ""
        }],
        "tiers": { //Full information of the different actors involved in the purchase, that will be end customer (buyer), there can be as many tiers as the number of resellers in the chain under the third-party CSB 130
            "customer": {
                "id": "CS-9861-7949-8492",
                "external_id": 12345, // third-party CSB 130 ID
                "account_name": "string",
                "contact_info": {
                    "address_line1": "Yah Mahallesi",
                    "address_line2": "",
                    "city": "Erdek",
                    "state": "string",
                    "postal_code": "10500",
                    "country": "tr",
                    "contact": {
                        "first_name": "Quickstart",
                        "last_name": "Long Running Operation",
                        "email": "qlro@ingrammicro.com",
                        "phone_number": {
```

```
            "country_code": "+90",
            "area_code": "546",
            "phone_number": "6317546",
            "extension": ""
          }
        }
      },
      "tier1": {
        "id": "RS-9861-7949-8492",
        "external_id": 12435,
        "account_name": "string",
        "contact_info": { ...
        }
      },
      "tier2": {
        "id": "RS-9861-7949-8492",
        "external_id": 12435,
        "account_name": "string",
        "contact_info": { ...
        }
      },
      "marketplace": { //marketplace from where asset was sold
        "id": "MP-9861-7949-8492",
        "name": "Ingram Micro Cloud United",
        "external_id": "12435 #OSA Account Id",
        "account_name": "string",
        "contact_info": { ...
        }
      }
    }
  }
}
```

In at least one embodiment of the present disclosure, the ISV is able to modify the parameters of the request only and move the request over the workflow. By way of an example, to update the parameters a PUT against the request ID is needed, data on the body may contain a new value or a reason why the value provided by the customer is wrong via the modification of the value_error. An example of a put to/requests/{id} with a body, is provided, according to at least one embodiment of the present disclosure:

```
{
  "asset":{
    "params":[
      {
        "id":"PM-9861-7949-8492-0001",
        "name":"Secondary email",
        "description":"This is a backup email for emergency",
        "value":"daniel.lark@example.com", //Modification possible
        "value_error":"Invalid address. Try another.", //Modification possible
        "value_choices":[
        ]
      }
    ]
  }
}
```

In at least one embodiment of the present disclosure, updating parameters allows the ISV to: (i) Interact with the buyer in order to request additional data or correct provided one; and (ii) Store information on the ordering system for future use on new requests for the same as set.

It will be appreciated that the posting API allows the creation of a request object, whereby one matches the fulfillment API with the add-on that allows external commerce to also pass external_attributes that will not be disclosed to vendor; and where such attributes are solely used by commerce system (e.g. CSB platform) to use the reporting or even on the retrieval of a request to match/reconcile the requests it created with its own internals. This extends request object as mentioned with an array like this:

```
"external_attributes": [
  {
    "id":"<Parameter ID Or key>",
    "value": "<Parameter value>"
  }
],
```

In at least one embodiment of the present disclosure, the assets, defined by one or multiple requests have a complete lifecycle controlled by the third-party CSB 130 platform that generates multiple requests over time. The complete asset life cycle may be covered by the workflow shown in FIG. 4.

Figure 4:
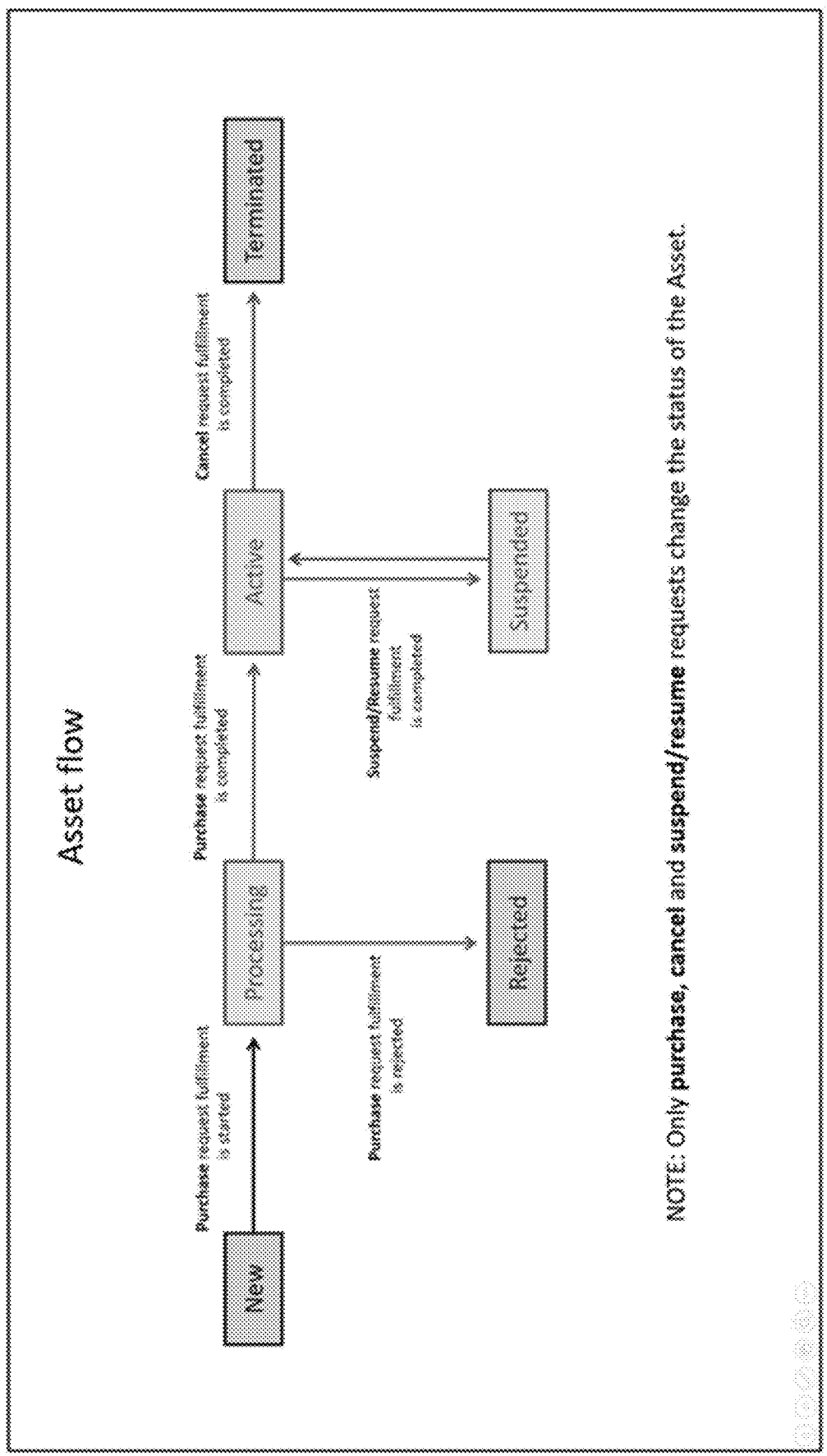
FIG. 4 displays a workflow a method for digital product onboarding and distribution using the cloud service brokerage infrastructure, according to at least one embodiment of the present disclosure.

In at least one embodiment of the present disclosure, an asset represents an instance of a product acquired by a customer with a limited amount of items. Referring to FIG. 4, there is shown a lifecycle modified by the multiple requests that points to it, according to at least one embodiment of the present disclosure. Each type of request will modify the status of the asset accordingly. By way of examples, an asset in "NEW" status means a purchase request has been issued but not all parameters had been filled yet by responsible party, and the ISV is still not aware of the asset. Continuing with the example, an asset in "PROCESSING" status means the ISV is still performing processing the purchase request or a change request, and the asset is not delivered to buyer yet but he is informed that work is in progress; an asset in status "REJECTED" means the ISV failed the purchase request (for various possible reasons) and the object receives a final non-recoverable status; an asset in "ACTIVE" status means the ISV completed the change/purchase/resume request and asset is operative and usable by buyer; an asset is "SUSPENDED" status occurs when an administrative hold notification is sent over a suspend request; and an asset in "TERMINATED" status means a final not recoverable status result of completing a cancelation request, and the asset object is not destroyed and remains on the system for tracking/reporting purposes.

While this disclosure has been described as having various embodiments, these embodiments according to the present disclosure can be further modified within the scope and spirit of this disclosure. This application is therefore intended to cover any variations, uses, or adaptations of the disclosure using its general principles. For example, any methods disclosed herein represent one possible sequence of performing the steps thereof. A practitioner may determine in a particular implementation that a plurality of steps of one or more of the disclosed methods may be combinable, or that a different sequence of steps may be employed to accomplish the same results. Each such implementation falls within the scope of the present disclosure as disclosed herein and in the appended claims. Furthermore, this application is intended to cover such departures from the present disclosure as come within known or customary practice in the art to which this disclosure pertains.

What is claimed is:

1. A method of digital product onboarding and distribution using a cloud service brokerage (CSB) infrastructure, the method comprising:
    creating a product model comprising a computer readable file using a product model construction tool at a vendor portal computing device, wherein the product model construction tool is provided via one or more application programming interfaces (APIs), the product model based at least in part on a first product;
    storing the product model at a marketplace product catalog;
    exporting the product model to a third-party CSB platform, wherein the CSB platform uses data from the product model for displaying an offer of the first product;
    exporting the product model to an ordering system;
    configuring the one or more APIs to receive a request for integration of the first product, the integration is operable to translate third-party CSB APIs into a standard posting API of the ordering system;
    receiving, at the ordering system, the request for integration of the first product, wherein the request includes a request product model payload; and
    fulfilling, at the order system, the request for integration of the first product, based at least in part on a product attribute.

2. The method of claim 1, wherein the product model comprises a JavaScript object notation (JSON) file.

3. The method of claim 1, wherein the request is received from the third-party CSB platform.

4. The method of claim 3, wherein the request is received via a fulfillment user interface or a fulfillment API.

5. The method of claim 1, wherein the request is received from an independent service vendor integration layer.

6. The method of claim 1, where the request is selected from the group consisting of: a purchase action, a cancel action, a suspend action, and a resume action.

7. The method of claim 6, where the request further comprises an operation selected from a request list, request details, modify request, and change request.

8. The method of claim 1, wherein the product model includes a product hierarchy.

9. The method of claim 8, wherein the product hierarchy comprises at least one parent item.

* * * * *